(12) United States Patent
Ruckstuhl et al.

(10) Patent No.: US 10,826,835 B2
(45) Date of Patent: Nov. 3, 2020

(54) CHAINING OF NETWORK SERVICE FUNCTIONS IN A COMMUNICATION NETWORK

(71) Applicant: NOKIA SOLUTIONS AND NETWORKS OY, Espoo (FI)

(72) Inventors: Hanspeter Ruckstuhl, Wolfratshausen (DE); Rainer Stademann, Berg (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 172 days.

(21) Appl. No.: 15/512,173

(22) PCT Filed: Sep. 19, 2014

(86) PCT No.: PCT/EP2014/069993
§ 371 (c)(1),
(2) Date: Mar. 17, 2017

(87) PCT Pub. No.: WO2016/041606
PCT Pub. Date: Mar. 24, 2016

(65) Prior Publication Data
US 2017/0250917 A1    Aug. 31, 2017

(51) Int. Cl.
*H04L 12/851* (2013.01)
*H04L 12/26* (2006.01)
(Continued)

(52) U.S. Cl.
CPC ........ *H04L 47/2441* (2013.01); *H04L 43/028* (2013.01); *H04L 45/306* (2013.01);
(Continued)

(58) Field of Classification Search
CPC . H04L 47/2441; H04L 45/306; H04L 43/028; H04L 45/38; H04L 47/32
See application file for complete search history.

(56) References Cited

U.S. PATENT DOCUMENTS 8,612,612 B1   12/2013  Dukes et al.
8,654,668 B2    2/2014  Fendick et al.
(Continued)

FOREIGN PATENT DOCUMENTS

CN     1968508 A    5/2007
CN   101491061 A    7/2009
(Continued)

OTHER PUBLICATIONS

International Search Report and Written Opinion dated Jun. 1, 2015 corresponding to International Patent Application No. PCT/EP2014/069993.

(Continued)

*Primary Examiner* — Jeffrey M Rutkowski
*Assistant Examiner* — Chae S Lee
(74) *Attorney, Agent, or Firm* — Squire Patton Boggs (US) LLP

(57) ABSTRACT

In an apparatus of a communication network first packets of a data flow in a first direction are acquired, each having a first service chain identifier identifying a first chain of services which have been applied to the first packets in the first direction of the data flow. The first service chain identifier represents a classification result of classification functions used for selecting the first chain of services. Based on the first service chain identifier, a packet filter is calculated, which is associated with a second chain of services to be applied to second packets of the data flow in a second direction of the data flow when the second packets enter the communication network in the second direction.

25 Claims, 11 Drawing Sheets

(51) Int. Cl.
*H04L 12/725* (2013.01)
*H04L 12/721* (2013.01)
*H04L 12/823* (2013.01)
*H04L 12/24* (2006.01)

(52) U.S. Cl.
CPC .............. *H04L 45/36* (2013.01); *H04L 45/38* (2013.01); *H04L 47/32* (2013.01); *H04L 41/0806* (2013.01); *H04L 41/0893* (2013.01); *H04L 41/5096* (2013.01)

(56) References Cited

U.S. PATENT DOCUMENTS

| | | | |
|---|---|---|---|
| 2013/0227071 A1* | 8/2013 | Valluri | H04L 12/66 709/217 |
| 2013/0272305 A1 | 10/2013 | Lefebvre et al. | |
| 2013/0287022 A1 | 10/2013 | Banavalikar et al. | |
| 2014/0010085 A1 | 1/2014 | Kavunder et al. | |
| 2014/0050223 A1 | 2/2014 | Foo et al. | |
| 2014/0119374 A1* | 5/2014 | Balasubramanian | H04L 47/2441 370/392 |
| 2014/0254374 A1 | 9/2014 | Janakiraman et al. | |
| 2014/0334295 A1* | 11/2014 | Guichard | H04L 47/2475 370/230 |
| 2014/0334488 A1* | 11/2014 | Guichard | H04L 45/306 370/392 |
| 2015/0281063 A1* | 10/2015 | Bitar | H04L 45/74 370/392 |
| 2016/0050141 A1* | 2/2016 | Wu | H04L 41/5054 370/389 |

FOREIGN PATENT DOCUMENTS

| | | |
|---|---|---|
| CN | 103338150 A | 10/2013 |
| JP | 2015-154421 A | 8/2015 |
| WO | WO 2014/182615 A | 11/2014 |

OTHER PUBLICATIONS

J. Halpern et al.: "Service Function Chaining (SFC) Architecture; draft-ieff-sfc-architecture-00.txt," Internet Engineering Task Force, IETF; Standardworkingdraft, Internet Society (ISOC), Sep. 8, 2014, pp. 1-26, XP015101527.
Notification of Reason(s) for Rejection dated May 1, 2018 corresponding to Japanese Patent Application No. 2017-515732.
Korean Office Action corresponding to Appln. No. 10-2017-7010402, dated Oct. 16, 2018.
Notice of Final Rejection issued in corresponding Korean Patent Application No. 10-2017-7010402, dated Jun. 24, 2019.
Chinese Office Action corresponding to CN Appln. No. 201480083541.3, dated Nov. 25, 2019.
Communication pursuant to Article 94(3) EPC dated Jun. 8, 2020 corresponding to European Patent Application No. 14771564.3.
R. Fernando et al., "Virtual Topologies for Service Chaining in BGP/IP MPLS VPNs; draft-rfernando-I3vpn-service-chaining-04.txt," Internet Engineering Task Force, IETF; Standard working draft, Internet Society (ISOC) 4, Jul. 5, 2014, pp. 1-17, XP015100524.

* cited by examiner

CHAINING OF NETWORK SERVICE FUNCTIONS IN A COMMUNICATION NETWORK

BACKGROUND OF THE INVENTION

Field of the Invention

The present invention relates to networking, including Software Defined Networking (SDN) and, more specifically, to chaining of virtualized or physical network service functions to provide or customize externally visible network services offered by a Communication Services Provider (CSP) to his customers.

Related Background Art

Prior art which is related to this technical field can e.g. be found in:
Patent Document U.S. Pat. No. 8,612,612B1
Patent Document U.S. Pat. No. 8,654,668 B2
Patent Document US 2014/0010085 A1
Patent Document US 2014/0050223 A1
The following meanings for the abbreviations used in this specification apply:
3GPP 3rd Generation Partnership Project
CSP Communication Services Provider
DF Data Flow—an aggregate set of packet flows that match a set of
packet flow header parameter values/ranges
DL Downlink
DPI Deep Packet Inspection
FW Firewall
IETF Internet Engineering Taskforce
IP Internet Protocol
IPSec IP Security
MPLS Multiprotocol Label Switching
NAT Network Address Translation
SCS Service Chaining System
SDN Software Defined Networking
SDO Standards Development Organizations
SFC Service Function Chaining
TCP Transmission Control Protocol
UDP User Datagram Protocol
UE User Equipment
UL Uplink
VLAN Virtual Local Area Network
WG Working Group A network service—an externally visible service offered by a network operator—can be built from distinct service functions executed in a pre-determined sequence as shown in FIG. 1. Service functions (e.g. Network Address Translation (NAT), Firewall (FW), Deep Packet Inspection (DPI)) apply a distinct treatment to packets of a data flow. Some service functions are bidirectional (i.e. handle packets flowing in either direction), other service functions are unidirectional (i.e. handle only uplink or only downlink packets).

An ordered sequence of service functions is often referred to as a service chain. Service chains can be
bidirectional, i.e. the service chains comprise only bidirectional service functions and handle bidirectional data flows, which traverse the same service functions in downlink (DL) and uplink (UL) direction, albeit in reverse order, or
unidirectional, i.e. the service chains comprise only unidirectional service functions and handle unidirectional data flows, or
associated bidirectional, i.e. the service chains comprise only unidirectional service functions and handle only one direction of bidirectional data flows.

Service chains are selected by classification functions, which match received data packets with policy and customer/network/service profiles. Dependent on the policies and profiles in use and data packets received, a packet classifier as illustrated in FIG. 1 imposes a bidirectional service chain, an unidirectional service chain or an associated bidirectional service chain. When data flows are bidirectional, UL and DL classification must be provisioned with pairs of matching filter rules—which are referred to as UL filter rules and DL filter rules—such that the packets flowing in either direction are directed into the desired bidirectional or associated bidirectional service chain.

In the prior art, matching filter rules for the UL and DL directions are used as depicted in FIG. 2 and described in the above cited Patent Documents which are concerned with service chaining.

Two basic deployment alternatives exist for classifiers.
Deployment alternative 1 (shown in FIG. 1) uses separate classifiers for either traffic direction.
Deployment alternative 2 (shown in FIG. 2) uses just one classifier for both traffic directions.

For both alternatives uplink and downlink filter rules must be matched such that the desired service chain is selected for both the uplink and downlink traffic direction.

Providing matching uplink and downlink packet filters becomes challenging if service functions alter header parameters, which are used to classify the data packets. For this case, in the prior art there are two solutions alternatives, both with a fair set of issues, for providing the classifier(s) with matching filter rules for the UL and DL direction:
Dynamic provisioning of matching of filter rules as shown in FIG. 3: A filter rule for the reverse direction is generated dynamically from an original filter rule and from information provided by service functions. This requires that the service functions report, in real-time, modifications of packet header fields used for classification.
Static Provisioning of matching filter rules: The filter rule for the reverse direction is derived from the original filter rule and configuration settings for a packet treatment of service functions. This allows that the classifier (s) can be configured with the necessary filter rules already when a service chain is deployed.

A common concept of any service chaining systems (as e.g. the ones described in the referenced Patent Documents) is a service chain identifier, which is determined by the classifiers. This service chain identifier represents a classification result and avoids re-classification at each forwarding element within the service chaining system. In addition, the service chain identifier facilitates an aggregation of multiple low bandwidth packet data flows, which require the same packet treatment, into one high bandwidth packet data flow.

Today's service chaining solutions cannot address a wide range of scenarios, because matching filter rules cannot be provisioned. These service chaining scenarios include:
service chains containing service functions, which "silently" alter packet headers,
service chains containing a large number of service functions, such that maintaining matching filter rules becomes too complex operationally,
service chains extending across multiple administrative domains, which are not willing to share classification information. This case is rather typical for a virtualized packet core, where one classification function is provided by a mobile operator (data center tenant) whilst the other classification function is provided by a data center provider.

SUMMARY OF THE INVENTION

The present invention aims at overcoming the above drawbacks. For example, the invention aims at automatically determining a reverse service chain.

According to at least one embodiment, the invention provides a method, an apparatus and a computer program product for automatically learning a reverse direction for bidirectional and associated bidirectional service chains such that only single-ended provisioning of classification rules is required. Once a service chain has been determined e.g. based on provisioned classification rules, the reverse service chain is automatically determined based on information, e.g. a service chain identifier, which is included in frames/packets belonging to a given service chain.

In the following the invention will be described by way of embodiments thereof with reference to the accompanying drawings.

DESCRIPTION OF THE EMBODIMENTS

In the following, embodiments and implementation examples of the invention will be described by particularly referring to FIGS. 4 to 11.

Figure 1:
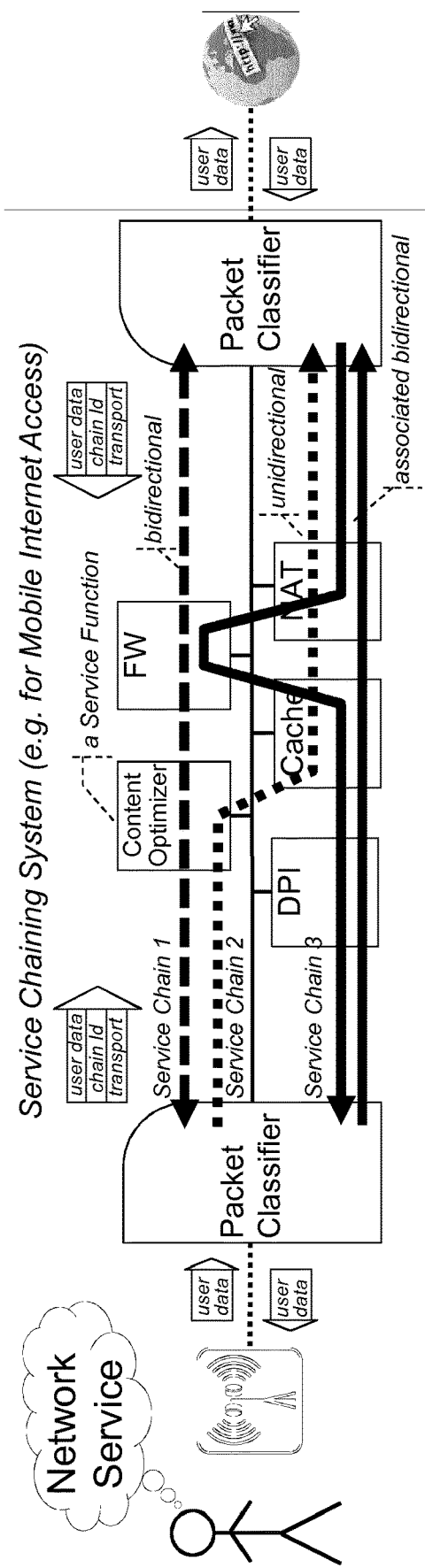
FIG. 1 shows a diagram for explaining service chaining terminology and basic architecture.
Figure 2:
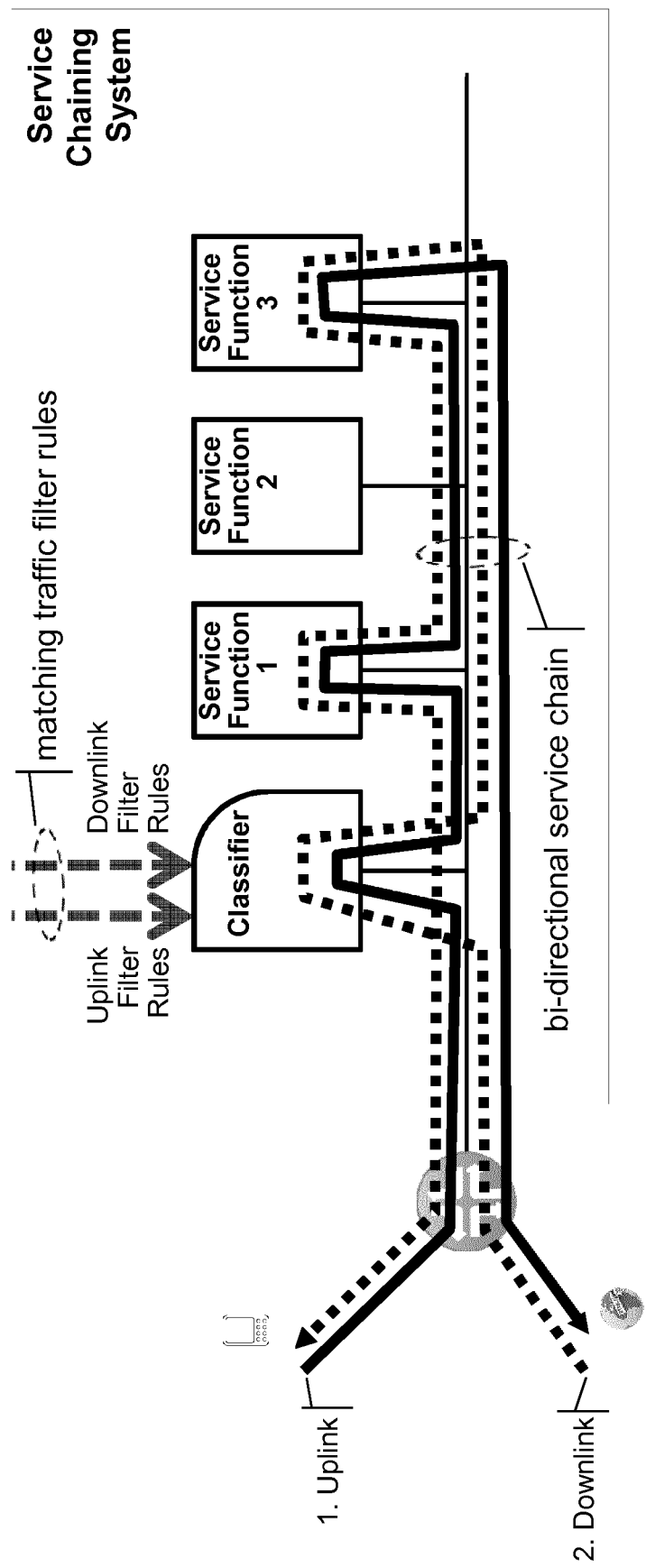
FIG. 2 shows a diagram illustrating UL and DL traffic flows according to the prior art, which are classified using a pair of matching filter rules to ensure bi-directionally correlated service handling.
Figure 3:
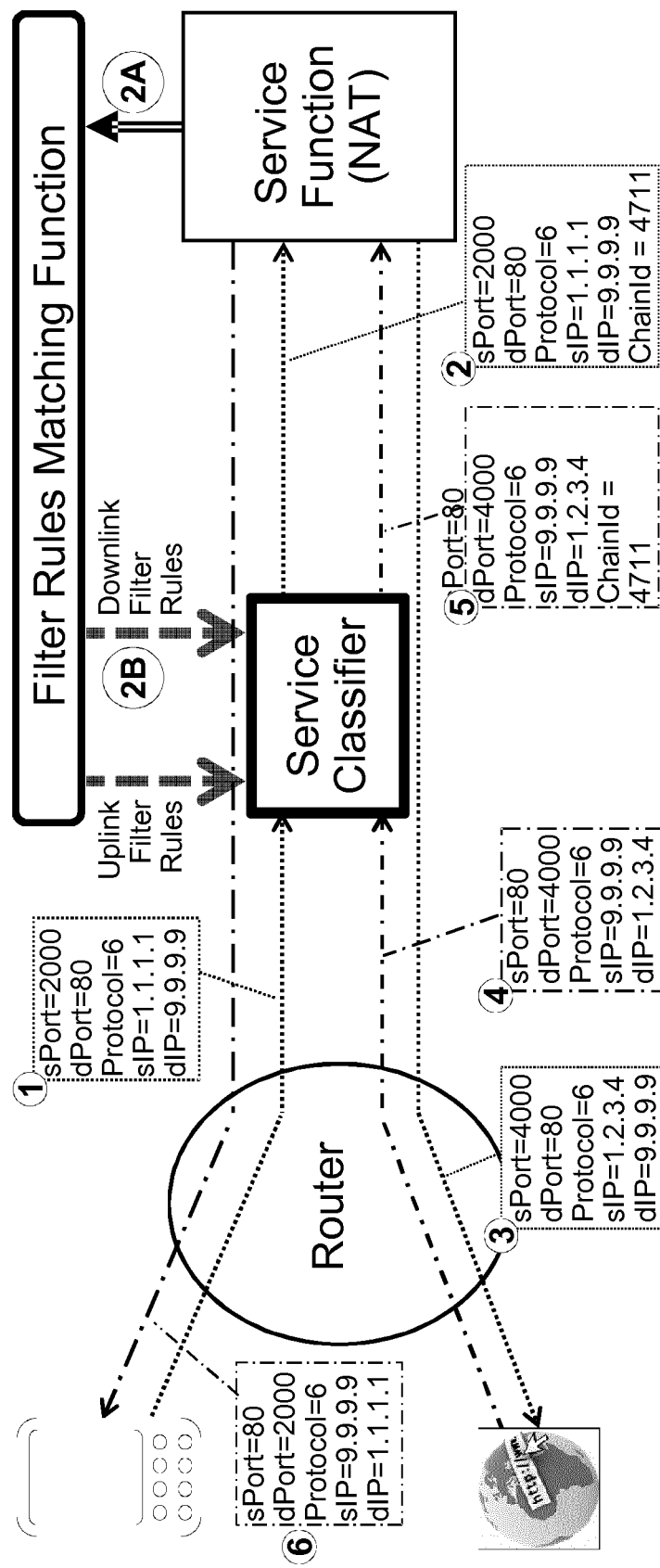
FIG. 3 shows a diagram illustrating live of a packet through a service chaining system according to the prior art, which requires dynamic matching of uplink and downlink filter rules.
Figure 4:
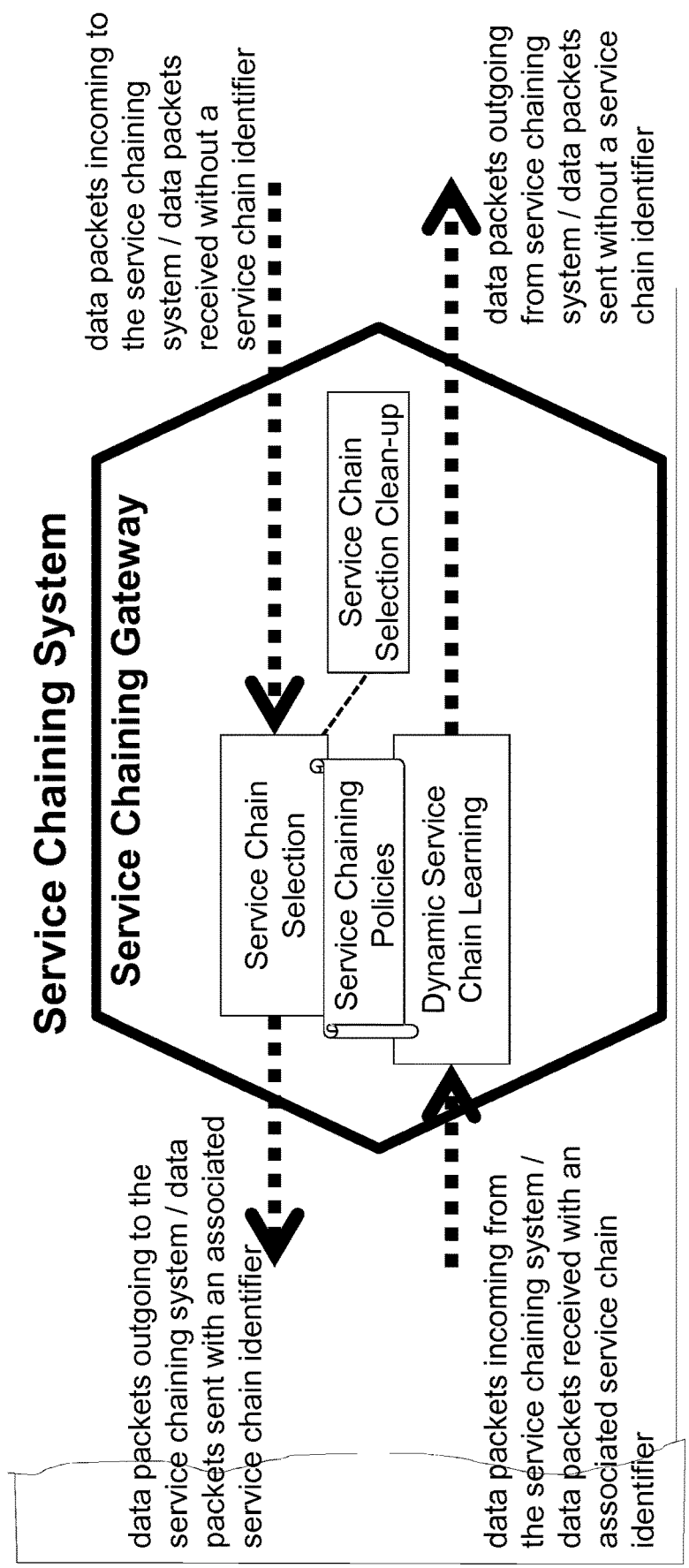
FIG. 4 shows a diagram illustrating a configuration of a service chaining gateway according to an embodiment of the invention.

FIG. 4 shows a diagram illustrating a configuration of a service chaining gateway according to an embodiment of the invention. The service chaining gateway can be deployed at the edge of a service chaining system (SCS), and works in concert with a (packet) classifier.

The service chaining gateway is an apparatus of a communication network e.g. in a core domain, e.g. a mobile core network, fixed access domain, e.g. a fixed core network, and/or aggregation domain.

As depicted in FIG. 4, the service chaining gateway comprises a dynamic service chain learning element, a service chain selection element, service chaining policies and a service chain selection clean-up function, which will be described in more detail later on.

Figure 5:
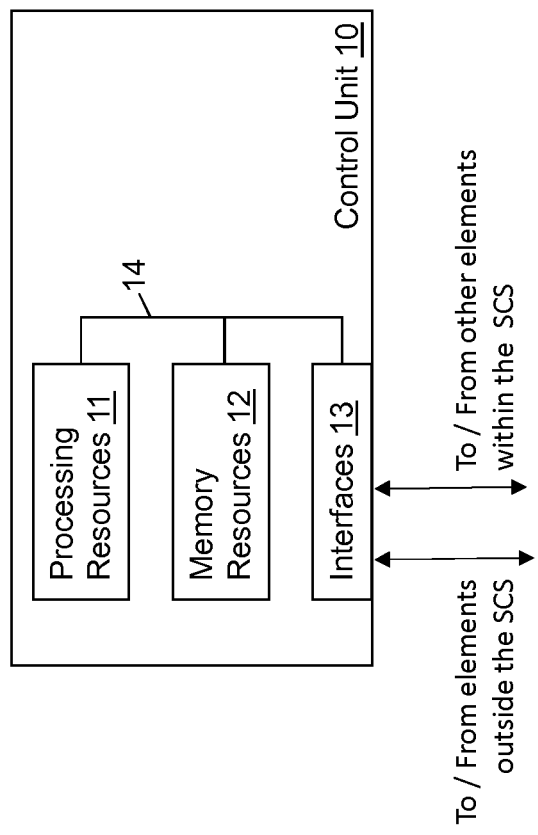
FIG. 5 shows a schematic block diagram illustrating a configuration of a control unit in which embodiments of the invention are implementable.

As a preliminary matter before exploring details of various embodiments and implementation examples, reference is made to FIG. 5 for illustrating a simplified block diagram of a control unit 10 suitable for use in practicing the exemplary embodiments of this invention. The control unit 10 comprises processing resources (e.g. processing circuitry) 11, memory resources (e.g. memory circuitry) 12 and interfaces (e.g. interface circuitry) 13, connected via a link 14. The control unit 10 may be part of and/or used by the service chaining gateway of FIG. 4. The interfaces 13 provide connections to and from elements outside a service chaining system and to and from other elements within a service chaining system.

According to an implementation example of the invention, the memory resources 12 store a program assumed to include program instructions that, when executed by the processing resources 11, enable the control unit 10 to operate in accordance with the embodiments of this invention, as detailed below.

In general, the embodiments of this invention may be implemented by computer software stored in the memory resources 12 and executable by the processing resources 11, or by hardware, or by a combination of software and/or firmware and hardware.

The memory resources 12 may comprise distributed storage devices, may be of any type suitable to the local technical environment and may be implemented using any suitable data storage technology, such as semiconductor-based memory devices, magnetic memory devices and systems, optical memory devices and systems, fixed memory and removable memory. The processing resources 11 may comprise distributed processing devices, may be of any type suitable to the local technical environment, and may include one or more of general purpose computers, special purpose computers, microprocessors, digital signal processors (DSPs) and processors based on a multi-core processor architecture, as non-limiting examples.

The dynamic service chain learning element of the service chaining gateway dynamically calculates filter rules, i.e. a packet filter (e.g. TCP/IP 5-tuple—IP source address, IP destination address, protocol, TCP/UDP source port, TCP/UDP destination port) and a service chain identifier (also referred to as second service chain identifier), associated with a reverse service chain (service chain of reverse direction). This automatic calculation of filter rules occurs when classified data packets (also referred to as first packets), i.e. data packets with an associated service chain identifier (also referred to as first service chain identifier), are received from a service chaining system. The calculation of the filter rules for the reverse direction (here also referred to as second direction) is governed by the service chaining policies, e.g. stored in a table with one row per service chain identifier, containing filter rules to construct the packet filter for the reverse direction and the service chain identifier for the reverse direction. Note that the filter rules for calculating the packet filter for the reverse direction are completely independent of a packet treatment applied by service functions of the service chain.

Alternatively, a (packet) classifier may determine not only the first service chain identifier of the service chain starting at its end, but also the far end service chaining policies (i.e. mapping relation between the first service chain identifier and the second service chain identifier and the translation rule to determine the packet filter for the second packets from the first packets) and include them in frames/packets sent into a given service chain. This will allow the service chaining gateway to determine the service chain identifier and packet filter for the data flow in the second direction without locally configured service chaining policies.

In other words, according to an embodiment of the invention, in the service chaining gateway, first packets of a data flow in a first direction are acquired, wherein each of the first packets has a first service chain identifier identifying a first chain of services which have been applied to the first packets in the first direction of the data flow. The first service chain identifier represents a classification result of classification functions used for selecting the first chain of services e.g. by the packet classifier, wherein the first service chain identifier is deleted when the first packets leave the communication network.

Further, in the service chaining gateway, a packet filter is calculated based on the first service chain identifier, wherein the packet filter is associated with a second chain of services to be applied to second packets of the data flow in a second direction of the data flow when the second packets enter the communication network in the second direction.

It is to be noted that the term "service chain identifier" does neither imply a specific technology nor specific header field(s).

According to an embodiment of the invention, the service chaining gateway determines, based on the first service chain identifier, a second service chain identifier identifying the second chain of services.

There is also a case in which first packets, i.e. packets with the first service chain identifier, include a second service chain identifier identifying the second chain of services. According to an embodiment of the invention, the service chaining gateway stores, for the first service chain identifier, filter rules for calculating the packet filter and/or the second service chain identifier.

The service chain selection element of the service chaining gateway installs the filter rules (i.e. packet filter and service chain identifier) calculated by the dynamic service chain learning element according to the service chaining policies. If a packet matches a packet filter, the corresponding service chain identifier is applied and the corresponding service chain is imposed. The successful use of a filter rule is recorded, e.g. with some time stamp, such that active and inactive filter rules can be distinguished.

In other words, according to an embodiment of the invention, the service chaining gateway determines, as the second packets, packets which enter the communication network in the second direction and match the packet filter, and adds the second service chain identifier to the second packets.

The service chaining policies of the service chaining gateway provide two sets of policy rules:

A mapping rule between the received, i.e. first service chain identifier (associated with already classified data packets incoming from the service chaining) and the second service chain identifier associated with data packets in the reverse direction.

Translation rules describing how the packet filter for the reverse direction (i.e. incoming to the service chaining system) is derived from the already classified data packets incoming from the service chaining system.

The translation rules will also identify packet data fields, which should be used to calculate a new filter rule:

a) fields of data packets incoming from the service chaining system (i.e. data packets which the classifier had previously classified, which are also referred to as first packets), which are to be evaluated to determine the filter rules, and b) fields of data packets incoming to the service chaining system (i.e. data packets which the chaining gateway has to classify, which are also referred to as second packets) that must be filtered to determine the service chain identifier.

In other words, according to an embodiment of the invention, the service chaining policy rules (which are also referred to as filter rules) comprise translation rules for deriving the packet filter from the first packets, and a mapping rule for determining the second service chain identifier from the first service chain identifier. The translation rules may identify fields in the first packets used to calculate the filter rules, and/or fields in the second packets used to determine the second service chain identifier.

The nature of the service chain, e.g. handling (bidirectional) TCP/IP flows, typically determines the translation rule for deriving the packet filter for the second packets from the first packets. The service chaining policies can therefore be determined and provisioned automatically when a bidirectional or associated bidirectional service chain is defined and provisioned.

The service chain selection clean-up function of the service chaining system removes obsolete filter rules (packet filter and associated service chain identifier) from the service chain selection element. However, a filter rule installed in the service chain selection element may be removed due to a number of triggers, e.g. external triggers via m-, c-, or u-plane, internal triggers such gateway restart, database reset, etc.

Figure 6:
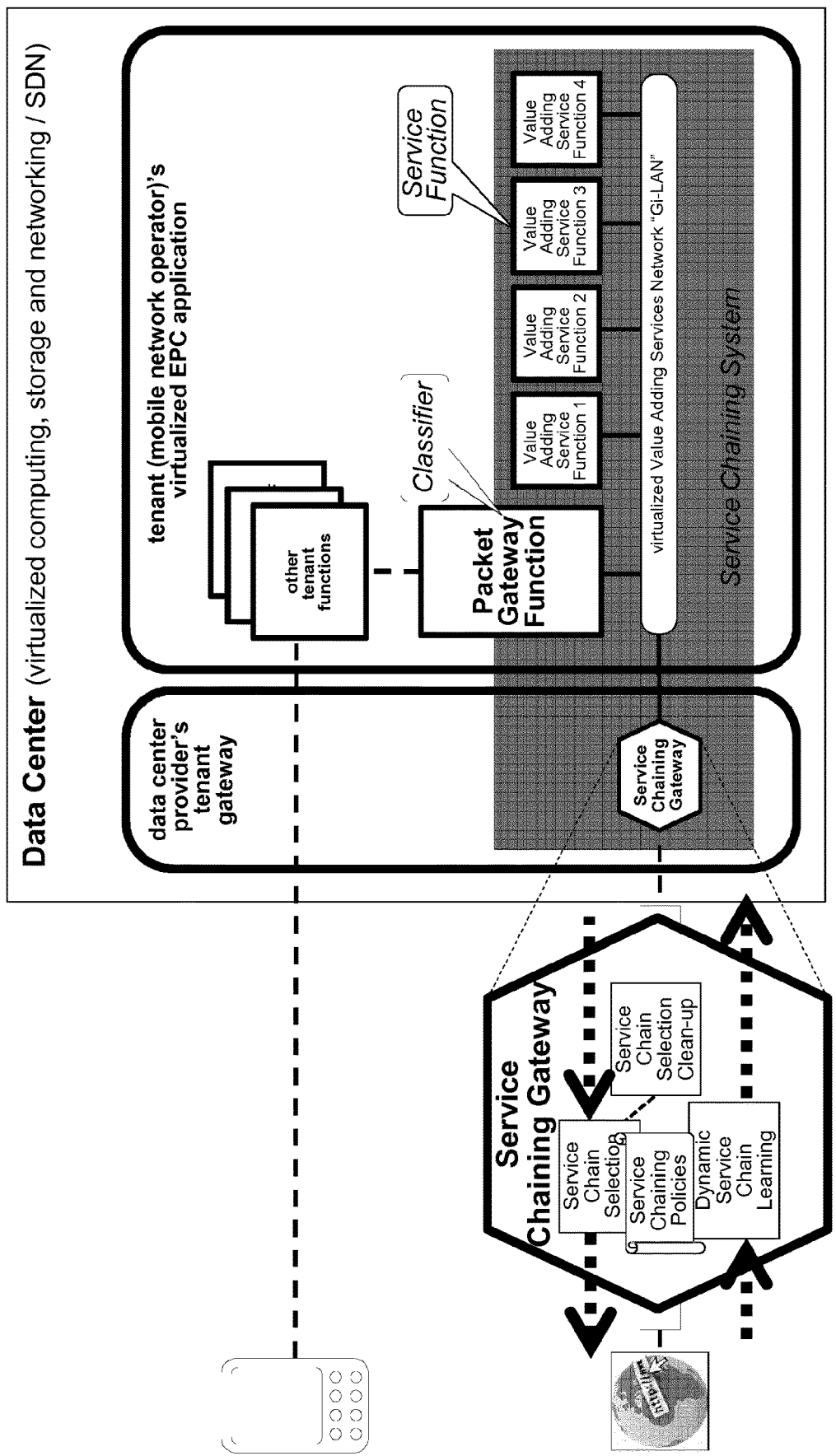
FIG. 6 shows a diagram illustrating an embodiment of the invention in which the service chaining gateway is used within a tenant gateway of a data center.

When the service chain selection element in the service chaining gateway fails to provide a service chain identifier and impose the corresponding service chain, e.g. no match with an active filter rule could be found, handling of the corresponding data packet is governed by corresponding service chaining policies. A non-exhaustive set of such policy actions are:

dropping the data packet applying a collocated classifier function to the data packet modifying, adding or deleting header fields of the data packet forwarding the data packet to an L2/L3 routing/forwarding function forwarding the data packet to a packet classifier function Another embodiment of this invention is a collocation of the service chaining gateway with a tenant gateway, which is a network function providing the demarcation between provider and tenant domain as illustrated in FIG. 6. This embodiment is particularly well suited for data centers, because all the tenant traffic must flow through the tenant gateway to get to the service chaining system. A mobile network operator, who has decided to virtualize its evolved packet core (EPC) and, in particular, its value adding services functions (often referred to as the "Gi-LAN") and deploy them in a data center is a likely candidate for using a data center provider's service chaining gateway embodied in the tenant gateway. In this scenario, the 3GPP standardized Packet Gateway Function comprises the function of the (packet) classifier and the tenant gateway comprises the service chaining gateway function.

Figure 7:
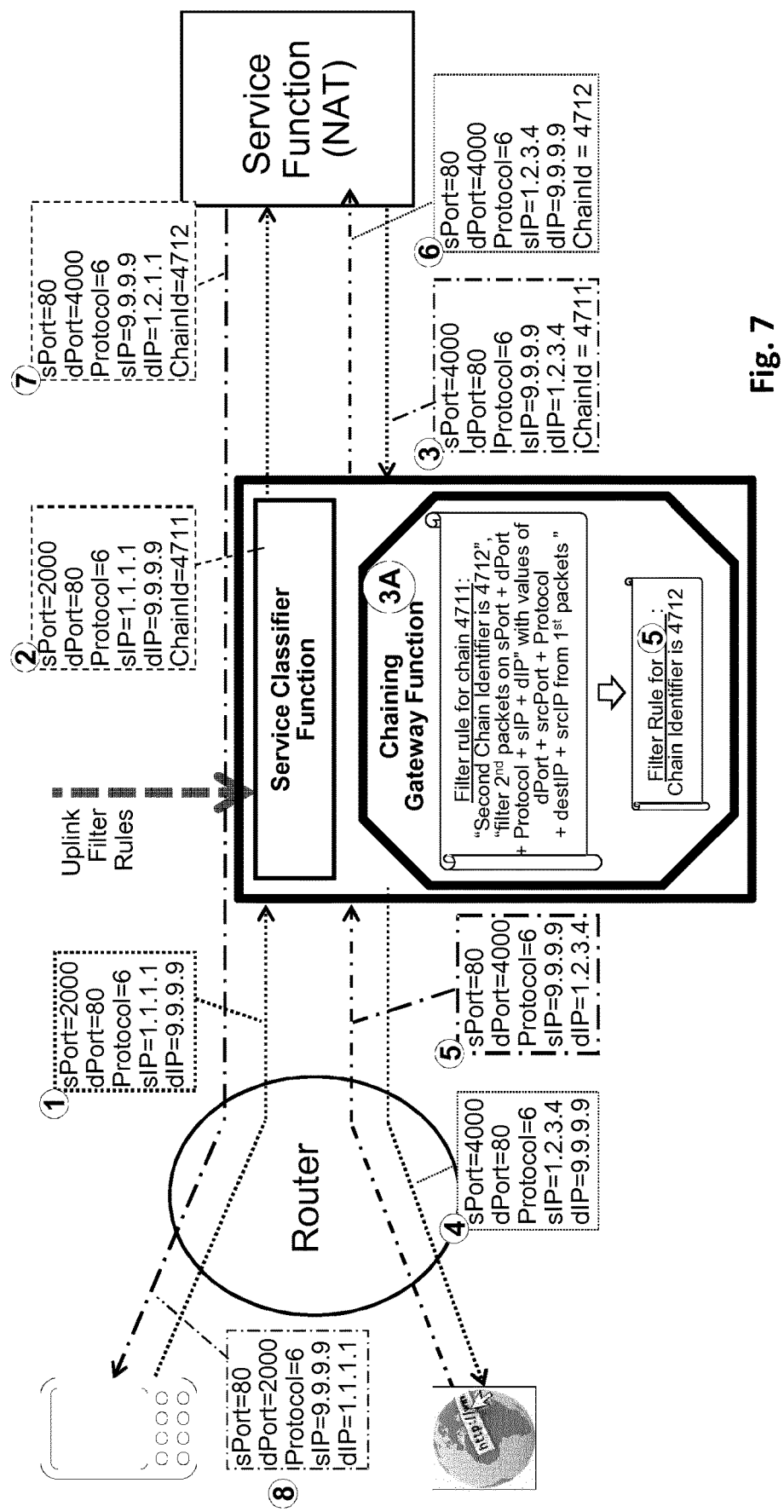
FIG. 7 shows a diagram illustrating the live of packets through a service chaining system according to an implementation example of the invention, in which packet filter and service chain for a reverse path are dynamically learned.

FIG. 7 shows the life of data packets according to an implementation example of this invention for a bidirectional service chain, which performs Network Address Translation (NAT), and a classifier which includes a packet classifier function (for UL) and function of the service chaining gateway (for DL). Essentially, the function of the service chaining gateway derives a second service chain identifier from a first service chain identifier associated with already classified data packets (first packets) received from a User Equipment (UE) according to the filter rule for chain 4711 "second service chain identifier is 4712", and the filter rule for the second packets according to the translation rule "filter second packets on sPort+dPort+Protocol+sIP+dIP with values of header fields dPort+sPort+Protocol+dIP+sIP from first packets". The resulting filter rule (sPort=4000+dPort=80+Protocol=6+sIP=9.9.9.9+dIP=1.2.3.4=>Chain Identifier is 4712) is applied to not yet classified data packets received from the Internet.

Figure 8:
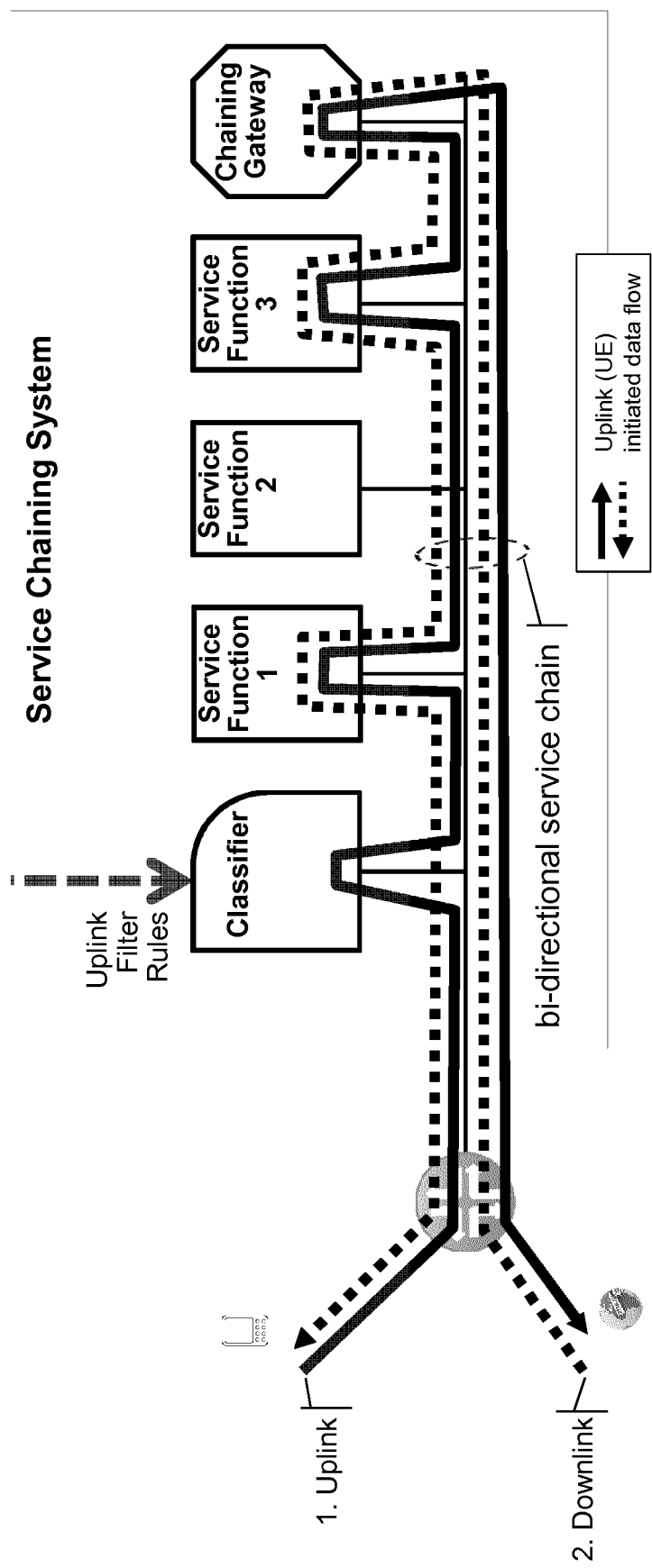
FIG. 8 shows a diagram illustrating a standalone classifier and chaining gateway according to an implementation example of the invention, implementing a bi-directional service chain.
Figure 9:
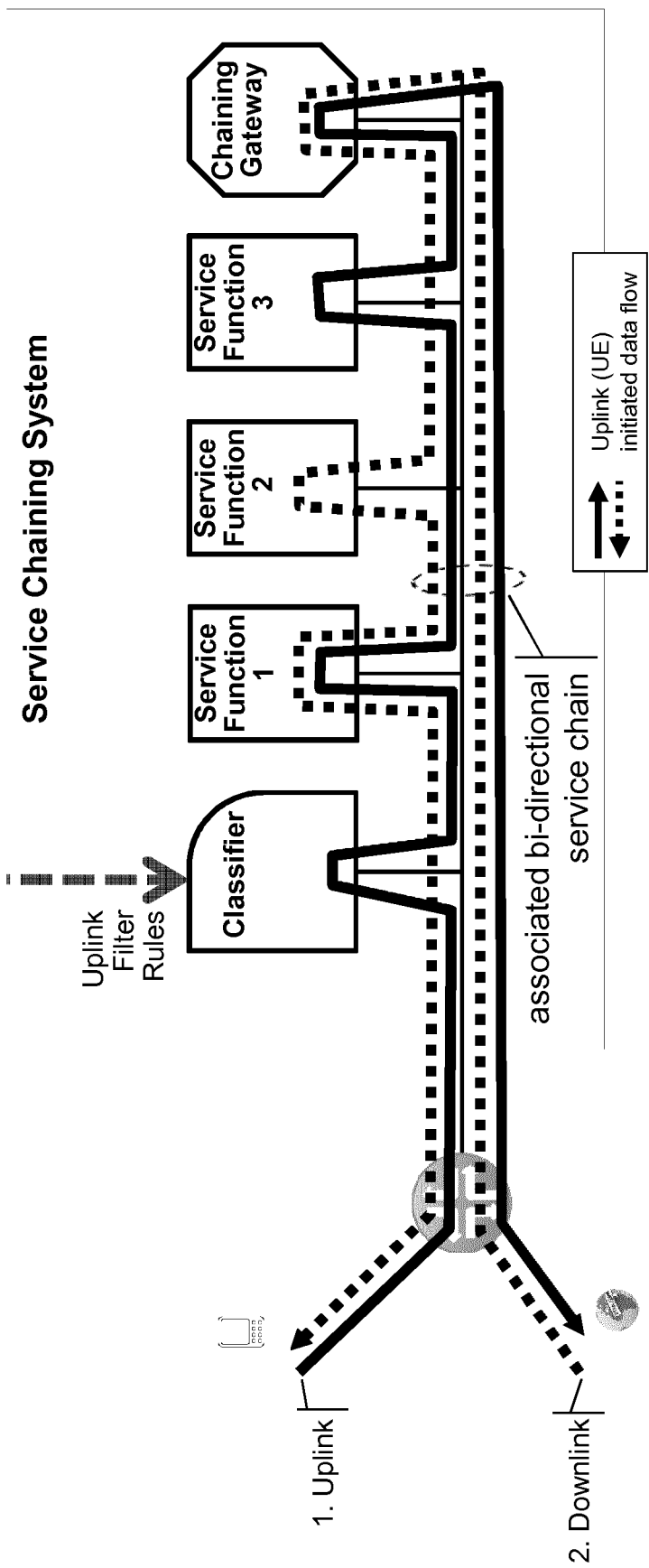
FIG. 9 shows a diagram illustrating a standalone classifier and chaining gateway according to an implementation example of the invention, implementing an associated bi-directional service chain.

As described above, the service chaining gateway enables bidirectional (see FIG. 8) and associated bidirectional service chains (see FIG. 9). For associated bidirectional service chains it is possible to map 1 to n incoming service paths to an arbitrary reverse service function path.

Figure 10:
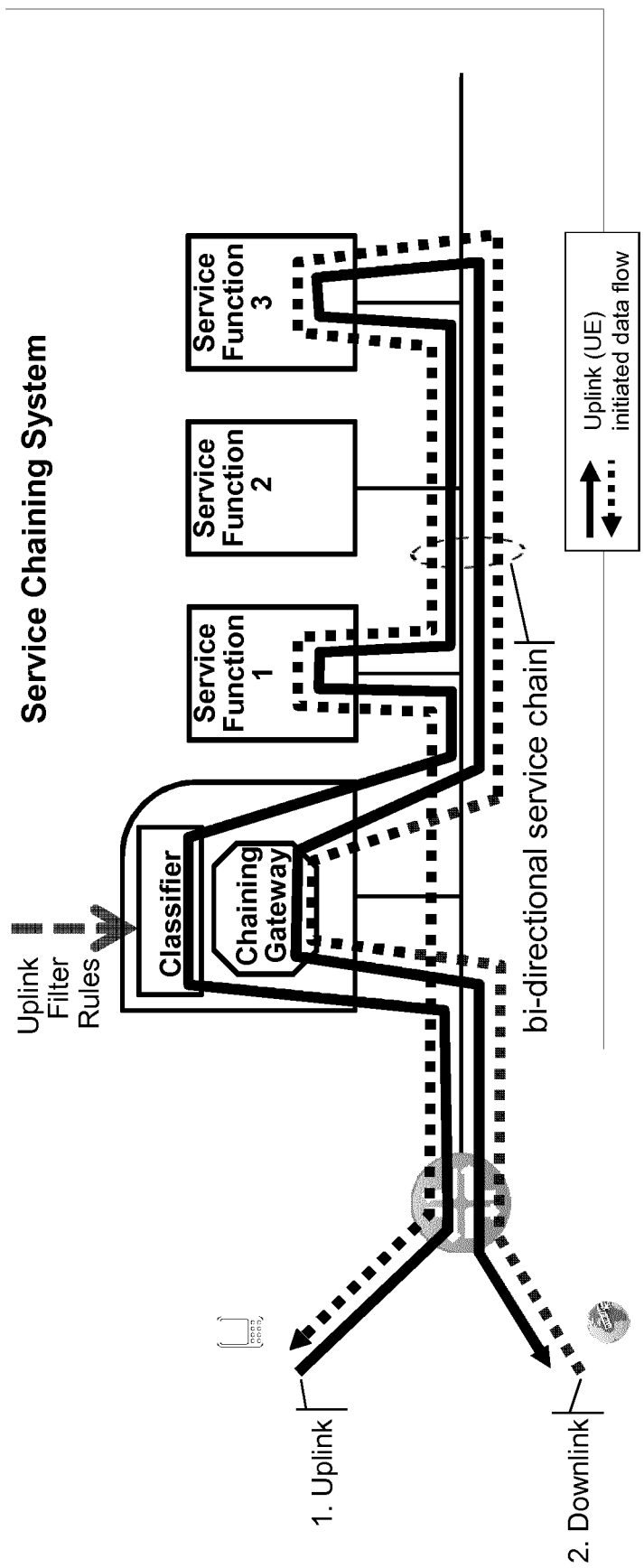
FIG. 10 shows a diagram illustrating a combined classifier and chaining gateway according to an implementation example of the invention, implementing a bi-directional service chain.
Figure 11:
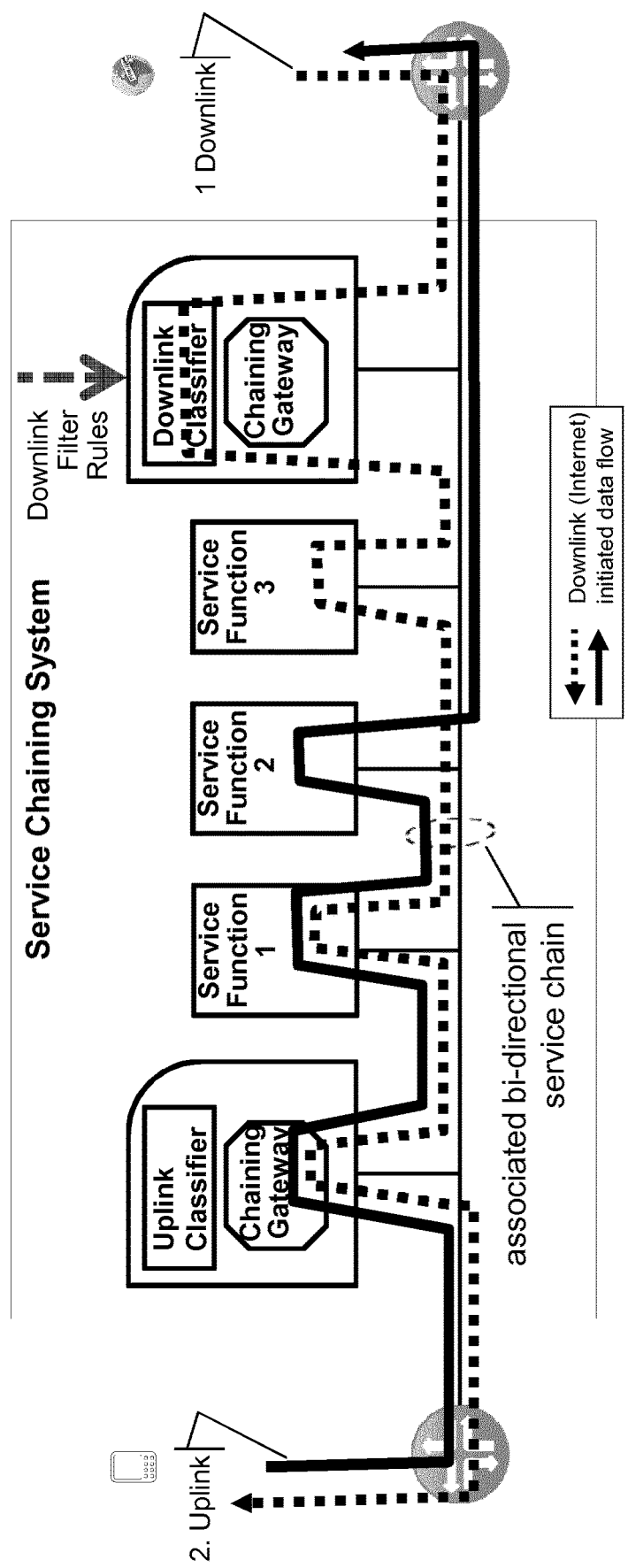
FIG. 11 shows a diagram illustrating a combined classifier and chaining gateway according to an implementation example of the invention, implementing an associated bi-directional service chain.

Further, the service chaining gateway supports bidirectional (see FIGS. 8 and 10) and associated bidirectional service chains (see FIGS. 9 and 11). The service chaining gateway supports both uplink (see FIGS. 8, 9 and 10) and downlink (see FIG. 11) initiated data flows alike.

Also, the service chaining gateway allows various deployment variants such as:

Separate classifier and service chaining gateway (see FIGS. 8 and 9). This deployment may be desired if only uplink or only downlink initiated data flows are to be classified and individually processed by the service chaining system. If both uplink and downlink initiated data flows are to be processed by the service chaining system, the service chaining gateway has to be configured to forward data packets, for which no active rule is found, to the classifier.

Collocation of classifier and service chaining gateway and single deployment. This means that uplink and downlink initiated data flows traverse the same combined element when entering and leaving the service chaining system as illustrated in FIG. 10. Note that uplink and downlink initiation entails different traffic flows, which each have to be assigned to a service chain.

Collocation of classifier and service chaining gateway and dual deployment. This means that uplink and downlink initiated data flows are classified by different instances of this combined element as illustrated in FIG. 11. Such a deployment may be desired for service chaining systems which are connected to separate upstream and downstream routing functions.

According to an embodiment of the invention in which the service chaining gateway further comprises functions of the classifier, e.g. in the collocation deployment described above, the service chaining gateway receives packets of a data flow in the first direction, selects, based on the classification functions, the first chain of services to be applied to the packets, which match the packets with at least one of policy, customer, network and service profile, and adds the first service chain identifier to the packets and forwards the packets as the first packets in the first direction.

According to an embodiment of the invention, the service chaining gateway includes additional elements such as:

A routing control function, which advertises—be it directly (e.g. by means of a routing protocol) or indirectly (e.g. via an SDN controller)—the reachability of IP addresses for which corresponding data traffic flows must be handled by the service chaining system.

A load balancing function, which uses header information of data packets incoming from the service chaining system—such as transport layer source IP of an upstream service function instance—to impose the same service function instance for the reverse path for data packets incoming to the service chaining system.

A metadata mirror function, which extracts and temporarily stores metadata received from first data packets and injects this metadata in the reverse direction on a per data flow basis.

Dynamic learning of reverse service chains by means of the service chaining gateway according to the present invention has many advantages:

The service chaining system is simplified by eliminating the complex, error prone and often proprietary solutions for generating matching uplink and downlink filter rules. The filter rules matching function is replaced with a generic (i.e. classifier agnostic) service chaining gateway.

Some service functions modify u-plane data packet fields that feed into the classification function. Examples are carrier grade NAT or IPSec encapsulation. This implies that different classification/filter rules must be applied for the UL and DL direction. The determination of the "matching" classification rules during service chain definition and deployment quickly becomes prohibitively complex given that a service path can comprise multiple service functions that modify data packets fields. Dynamic determination of "matching" classification rules based on information provided by the service functions requires very low latency communication and processing (classification rule for the reverse direction must be provided in real-time). Because a matching rule must be generated for every new packet data flow, such a solution, which relies on distributed information collection and processing, incurs a lot of signaling and will have limited scalability.

Prior art solutions often use a single classifier for the UL and DL direction. Imposing the same classifier instance for UL and DL direction may require special routing configuration and may result in sub-optimal (e.g. non shortest path) routing. The above-described service chaining gateway allows separate classifiers for UL and DL initiated data flows without incurring additional complexity as shown by FIG. 11.

According to an aspect of the invention, an apparatus of a communication network is provided, which may include and/or use the control unit 10 shown in FIG. 5. The apparatus comprises means for acquiring first packets of a data flow in a first direction, each having a first service chain identifier identifying a first chain of services which have been applied to the first packets in the first direction of the data flow, wherein the first service chain identifier represents a classification result of classification functions used for selecting the first chain of services, and means for calculating, based on the first service chain identifier, a packet filter associated with a second chain of services to be applied to second packets of the data flow in a second direction of the data flow when the second packets enter the communication network in the second direction.

The apparatus may further comprise means for determining, based on the first service chain identifier, a second service chain identifier identifying the second chain of services.

Alternatively, the apparatus may comprise means for extracting from at least one of the first packets a second service chain identifier identifying the second chain of services.

The means for determining may determine, as the second packets, packets which enter the communication network in the second direction and match the packet filter, and the apparatus may comprise means for adding the second service chain identifier to the second packets.

The apparatus may comprise means for storing, for the first service chain identifier, filter rules for calculating the packet filter and/or the second service chain identifier, wherein the filter rules comprise translation rules for deriving the packet filter from the first packets.

Alternatively, the means for extracting may extract from at least one of the first packets filter rules for calculating the packet filter and/or the second service chain identifier, wherein the filter rules comprise translation rules for deriving the packet filter from the first packets.

The apparatus may comprise means for detecting that at least one of the filter rules has become obsolete, and means for canceling the at least one obsolete filter rule.

The filter rules may comprise a mapping rule for determining the second service chain identifier from the first service chain identifier.

The translation rules may identify fields in the first packets used to calculate the filter rules, and/or fields in the second packets used to determine the second service chain identifier.

The data flow may be at least one of a bidirectional data flow, an associated bidirectional data flow, a downlink initiated data flow in which the first direction is a downlink direction and the second direction is an uplink direction, and an uplink initiated data flow in which the first direction is the uplink direction and the second direction is the downlink direction.

The apparatus may comprise means for receiving packets of a data flow in the first direction, means for selecting, based on the classification functions, the first chain of services to be applied to the packets, and the means for adding may add filter rules for calculating the packet filter and/or the second service chain identifier to the packets, and the apparatus may comprise means for forwarding the packets as the first packets in the first direction.

The means for detecting may detect packets which enter the communication network and do not match the packet filter, and the apparatus may comprise means for handling the packets by at least one of dropping these packets, applying a collocated classifier function to these packets, modifying, adding or deleting header fields of these packets, forwarding these packets to an L2/L3 routing/forwarding function, and forwarding these packets to a packet classifier function.

The apparatus may comprise means for advertising reachability of IP addresses for which the data flow is handled by a service chaining system providing the services of the first and/or second chains.

The apparatus may comprise means for imposing the same service function instance used for the first packets in the first direction in the second direction for the second packets.

The means for extracting may extract and the means for storing may temporarily storing metadata from the first packets, and the apparatus may include means for injecting the metadata in the second packets.

According to an implementation example of the invention, the above means for acquiring, calculating, determining, extracting, adding, storing, receiving, selecting, detecting, canceling, handling, forwarding, advertising, imposing and injecting are implemented by the processing resources 11, memory resources 12 and interfaces 13.

It is to be understood that the above description is illustrative of the invention and is not to be construed as limiting the invention. Various modifications and applications may occur to those skilled in the art without departing from the true spirit and scope of the invention as defined by the appended claims.

The invention claimed is:

1. A method for use by an apparatus of a communication network, the method comprising:
   acquiring first packets of a data flow in a first direction, each having a first service chain identifier identifying a first chain of services which have been applied to the first packets in the first direction of the data flow, wherein the first service chain identifier represents a classification result of classification functions used for selecting the first chain of services;
   calculating, based on the first service chain identifier, a packet filter associated with a second chain of services to be applied to second packets of the data flow in a second direction of the data flow when the second packets enter the communication network in the second direction;
   advertising, via routing protocol or software defined networking controller, reachability of internet protocol addresses for which the data flow is handled by a service chaining system providing the services of the first or second chains; and
   imposing, based on at least one transport layer source internet protocol address contained in header information of an upstream service function instance received from the service chaining system, the same service function instance used for the first packets in the first direction in the second direction for the second packets.

2. The method of claim 1, comprising:
   determining, based on the first service chain identifier, a second service chain identifier identifying the second chain of services.

3. The method of claim 1, comprising:
   extracting from at least one of the first packets a second service chain identifier identifying the second chain of services.

4. The method of claim 2, comprising:
   determining, as the second packets, packets which enter the communication network in the second direction and match the packet filter; and
   adding the second service chain identifier to the second packets.

5. The method of claim 1, comprising:
   storing, for the first service chain identifier, filter rules for calculating the packet filter or the second service chain identifier,
   wherein the filter rules comprise translation rules for deriving the packet filter from the first packets.

6. The method of claim 1, comprising:
   extracting from at least one of the first packets filter rules for calculating the packet filter or the second service chain identifier, wherein the filter rules comprise translation rules for deriving the packet filter from the first packets.

7. The method of claim 5, wherein the filter rules comprise a mapping rule for determining the second service chain identifier from the first service chain identifier.

8. The method of claim 5, wherein the translation rules identify fields in the first packets used to calculate the filter rules, or fields in the second packets used to determine the second service chain identifier.

9. The method of claim 1, wherein the data flow is at least one of a bidirectional data flow, an associated bidirectional data flow, a downlink initiated data flow in which the first direction is a downlink direction and the second direction is an uplink direction, and an uplink initiated data flow in which the first direction is the uplink direction and the second direction is the downlink direction.

10. The method of claim 1, comprising:
receiving packets of a data flow in the first direction;
selecting, based on the classification functions, the first chain of services to be applied to the packets; and
adding filter rules for calculating the packet filter or the second service chain identifier to the packets and forwarding the packets as the first packets in the first direction.

11. The method of claim 1, comprising:
detecting packets which enter the communication network and do not match the packet filter; and
handling the packets by at least one of dropping these packets, applying a collocated classifier function to these packets, modifying, adding or deleting header fields of these packets, forwarding these packets to an L2/L3 routing/forwarding function, and forwarding these packets to a packet classifier function.

12. The method of claim 1, comprising:
extracting and temporarily storing metadata from the first packets and injecting the metadata in the second packets.

13. The method of claim 5, comprising:
detecting that at least one of the filter rules has become obsolete; and
canceling the at least one obsolete filter rule.

14. A computer program product embodied on a non-transitory computer-readable medium, including a program for a control unit, comprising software code portions for performing the steps of claim 1 when the program is run on the control unit.

15. The computer program product according to claim 14, wherein the program is directly loadable into an internal memory of the control unit.

16. An apparatus comprising:
at least one processor; and
at least one memory including computer program code;
the at least one memory and the computer program code configured to, with the at least one processor, cause the apparatus at least to perform:
acquiring first packets of a data flow in a first direction, each having a first service chain identifier identifying a first chain of services which have been applied to the first packets in the first direction of the data flow, wherein the first service chain identifier represents a classification result of classification functions used for selecting the first chain of services;
calculating, based on the first service chain identifier, a packet filter associated with a second chain of services to be applied to second packets of the data flow in a second direction of the data flow when the second packets enter the communication network in the second direction;
advertising, via routing protocol or software defined networking controller, reachability of IP addresses for which the data flow is handled by a service chaining system providing the services of the first or second chains; and
imposing, based on at least one transport layer source internet protocol address contained in header information of an upstream service function instance received from the service chaining system, the same service function instance used for the first packets in the first direction in the second direction for the second packets.

17. The apparatus of claim 16, the at least one memory and the computer program code further configured to, with the at least one processor, cause the apparatus at least to perform:
determine, based on the first service chain identifier, a second service chain identifier identifying the second chain of services.

18. The apparatus of claim 16, the at least one memory and the computer program code further configured to, with the at least one processor, cause the apparatus at least to perform:
extract from at least one of the first packets a second service chain identifier identifying the second chain of services.

19. The apparatus of claim 17, the at least one memory and the computer program code further configured to, with the at least one processor, cause the apparatus at least to perform:
determine, as the second packets, packets which enter the communication network in the second direction and match the packet filter; and
add the second service chain identifier to the second packets.

20. The apparatus of claim 16, the at least one memory and the computer program code further configured to, with the at least one processor, cause the apparatus at least to perform:
store, for the first service chain identifier, filter rules for calculating the packet filter or the second service chain identifier,
wherein the filter rules comprise translation rules for deriving the packet filter from the first packets.

21. The apparatus of claim 16, the at least one memory and the computer program code further configured to, with the at least one processor, cause the apparatus at least to perform:
extract from at least one of the first packets filter rules for calculating the packet filter or the second service chain identifier,
wherein the filter rules comprise translation rules for deriving the packet filter from the first packets.

22. The apparatus of claim 16, the at least one memory and the computer program code further configured to, with the at least one processor, cause the apparatus at least to perform:
receive packets of a data flow in the first direction;
select, based on the classification functions, the first chain of services to be applied to the packets; and
add filter rules for calculating the packet filter or the second service chain identifier to the packets and forward the packets as the first packets in the first direction.

23. The apparatus of claim 16, the at least one memory and the computer program code further configured to, with the at least one processor, cause the apparatus at least to perform:
    detect packets which enter the communication network and do not match the packet filter; and
    handle the packets by at least one of dropping these packets, applying a collocated classifier function to these packets, modifying, adding or deleting header fields of these packets, forwarding these packets to an L2/L3 routing/forwarding function, and forwarding these packets to a packet classifier function.

24. The apparatus of claim 16, the at least one memory and the computer program code further configured to, with the at least one processor, cause the apparatus at least to perform:
    extract and temporarily store metadata from the first packets and injecting the metadata in the second packets.

25. The apparatus of claim 20, the at least one memory and the computer program code further configured to, with the at least one processor, cause the apparatus at least to perform:
    detect that at least one of the filter rules has become obsolete; and
    cancel the at least one obsolete filter rule.

\* \* \* \* \*